(12) United States Patent
Young et al.

(10) Patent No.: US 10,502,839 B2
(45) Date of Patent: Dec. 10, 2019

(54) BATTERY EFFICIENT AUTOMATIC MILEAGE TRACKING

(71) Applicants: Braden Young, Mountain View, CA (US); Pranay Airan, Bangalore (IN); Jean-Luc Delpech, Mountain View, CA (US); Scott Garten, Mountain View, CA (US)

(72) Inventors: Braden Young, Mountain View, CA (US); Pranay Airan, Bangalore (IN); Jean-Luc Delpech, Mountain View, CA (US); Scott Garten, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 331 days.

(21) Appl. No.: 15/339,895

(22) Filed: Oct. 31, 2016

(65) Prior Publication Data

US 2018/0120444 A1 May 3, 2018

(51) Int. Cl.
*G01S 19/24* (2010.01)
*G01S 19/34* (2010.01)
(Continued)

(52) U.S. Cl.
CPC ............. *G01S 19/34* (2013.01); *G01S 19/24* (2013.01); *G01S 19/42* (2013.01); *G01S 19/52* (2013.01); *G01S 19/14* (2013.01); *G01S 19/39* (2013.01)

(58) Field of Classification Search
CPC .......... G01S 19/24; G01S 19/34; G01S 19/42; G01S 19/52; G01S 19/14; G01S 19/39
See application file for complete search history.

(56) References Cited

U.S. PATENT DOCUMENTS

| 6,741,933 B1 * | 5/2004 | Glass .................... G07B 15/02 340/10.1 |
| 6,940,940 B2 | 9/2005 | Kranz |

(Continued)

FOREIGN PATENT DOCUMENTS

| WO | 2013056145 A1 | 4/2013 |
| WO | 2015149132 A1 | 10/2015 |

OTHER PUBLICATIONS

International Search Report and Written Opinion for PCT/US2017/028411, dated Jul. 20, 2017, 15 pages.

(Continued)

*Primary Examiner* — Kira Nguyen
(74) *Attorney, Agent, or Firm* — Ferguson Braswell Fraser Kubasta PC

(57) ABSTRACT

A method for reducing battery consumption while automatically tracking mileage may include detecting a trip initiation event at a location of a mobile device, initiating, by activating a geolocation sensor, tracking of global positions, and obtaining a global position of the mobile device corresponding to the location. The method may further include adding the global position to a global position sequence, and detecting, using trip updating parameters, a sequence of trip updating events. The trip updating parameters may include an update distance, an update period, and a reduced update velocity. The method may further include obtaining a sequence of updated global positions corresponding to the sequence of trip updating events. The method may further include adding each updated global position to the global position sequence, detecting a trip termination event, and stopping, in response to detecting the trip termination event, the tracking of global positions by deactivating the geolocation sensor.

17 Claims, 5 Drawing Sheets

(51) Int. Cl.
   *G01S 19/42* (2010.01)
   *G01S 19/52* (2010.01)
   *G01S 5/00* (2006.01)
   *G01S 19/14* (2010.01)
   *G01S 19/39* (2010.01)

(56) References Cited

U.S. PATENT DOCUMENTS

| | | | | |
|---|---|---|---|---|
| 7,756,617 | B1* | 7/2010 | Cluff | G07C 5/0858 |
| | | | | 340/476 |
| 7,908,191 | B1* | 3/2011 | Dinamani | G01C 22/02 |
| | | | | 340/988 |
| 8,949,022 | B1* | 2/2015 | Fahrner | G01C 21/00 |
| | | | | 340/995.19 |
| 9,720,099 | B1* | 8/2017 | Ekambaram | G01S 19/42 |
| 2007/0038352 | A1* | 2/2007 | Larschan | G06Q 10/06 |
| | | | | 701/33.4 |
| 2007/0124062 | A1 | 5/2007 | Janky et al. | |
| 2007/0249222 | A1* | 10/2007 | Skluzacek | H01R 9/2475 |
| | | | | 439/541.5 |
| 2009/0271111 | A1* | 10/2009 | Takanashi | G01C 21/20 |
| | | | | 701/533 |
| 2011/0144839 | A1* | 6/2011 | Pudar | B60W 40/09 |
| | | | | 701/22 |
| 2013/0006674 | A1* | 1/2013 | Bowne | G06Q 10/0639 |
| | | | | 705/4 |
| 2016/0035042 | A1* | 2/2016 | Bomze | H04W 4/029 |
| | | | | 705/30 |
| 2017/0016993 | A1* | 1/2017 | Liu | G01S 19/34 |

OTHER PUBLICATIONS

FollowMee (https://followmee.com), Oct. 29, 2016 (3 pages).
Shoeboxed Knowledge Base (http://support.shoeboxed.com/knowledgebase/articles/203738-the-shoeboxed-receipt-and-mileage-tracker-has-loca), Mar. 24, 2016, (3 pages).
Broadcom (http://www.broadcom.com/blog/smartphones/gps-world-blog-geofencing-and-location-apps-shouldnt-be-a-battery-killer/), Sep. 30, 2015 (22 pages).
How It Works (https://www.mileiq.com/howitworks), Oct. 25, 2017 (11 pages).

* cited by examiner

BATTERY EFFICIENT AUTOMATIC MILEAGE TRACKING

BACKGROUND

Various types of employees and business owners report the miles they drive for business purposes on their tax returns and expense reports. Tracking and calculating the miles driven can be a cumbersome, time-consuming, and error-prone process. Software applications running on mobile devices exist to automatically track and log miles driven. However, these applications typically place a substantial burden on the battery of the mobile device in order to obtain an acceptable level of accuracy.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for reducing battery consumption while automatically tracking mileage including detecting a trip initiation event for a trip at a first location of a mobile device, initiating, by activating a geolocation sensor of the mobile device and in response to detecting the trip initiation event for the trip, tracking of global positions of the mobile device, and obtaining a first global position of the mobile device corresponding to the first location. The first global position includes a first timestamp. The method further includes adding the first global position to a global position sequence of the trip, and detecting, using trip updating parameters, a sequence of trip updating events for the trip. Each trip updating event corresponds to an updated location of the mobile device. The trip updating parameters include an update distance, an update period, and a reduced update velocity. The method further includes obtaining a sequence of updated global positions corresponding to the sequence of trip updating events. Each updated global position includes an updated timestamp. The method further includes adding each updated global position to the global position sequence, detecting a trip termination event for the trip, stopping, in response to detecting the trip termination event for the trip, the tracking of global positions of the mobile device by deactivating the geolocation sensor of the mobile device, and calculating a length of the trip.

In general, in one aspect, one or more embodiments relate to a system for reducing battery consumption while automatically tracking mileage including a mobile device including a geolocation sensor, a computer processor, and a memory comprising instructions that, when executed by the computer processor, cause the computer processor to detect a trip initiation event for a trip at a first location of a mobile device, initiate, by activating a geolocation sensor of the mobile device and in response to detecting the trip initiation event for the trip, tracking of global positions of the mobile device, and obtain a first global position of the mobile device corresponding to the first location. The first global position includes a first timestamp. The instructions further cause the computer processor to add the first global position to a global position sequence of the trip, and detect, using trip updating parameters, a sequence of trip updating events for the trip. Each trip updating event corresponds to an updated location of the mobile device. The trip updating parameters include an update distance, an update period, and a reduced update velocity. The instructions further cause the computer processor to obtain a sequence of updated global positions corresponding to the sequence of trip updating events. Each updated global position includes an updated timestamp. The instructions further cause the computer processor to add each updated global position to the global position sequence, detect a trip termination event for the trip, stop, in response to detecting the trip termination event for the trip, the tracking of global positions of the mobile device by deactivating the geolocation sensor, and calculate a length of the trip. The system further includes a data repository configured to store the trip.

In general, in one aspect, one or more embodiments of the invention relate to a non-transitory computer readable medium including instructions that, when executed by a processor, perform a method for reducing battery consumption while automatically tracking mileage including detecting a trip initiation event for a trip at a first location of a mobile device, initiating, by activating a geolocation sensor of the mobile device and in response to detecting the trip initiation event for the trip, tracking of global positions of the mobile device, and obtaining a first global position of the mobile device corresponding to the first location. The first global position includes a first timestamp. The method further includes adding the first global position to a global position sequence of the trip, and detecting, using trip updating parameters, a sequence of trip updating events for the trip. Each trip updating event corresponds to an updated location of the mobile device. The trip updating parameters include an update distance, an update period, and a reduced update velocity. The method further includes obtaining a sequence of updated global positions corresponding to the sequence of trip updating events. Each updated global position includes an updated timestamp. The method further includes adding each updated global position to the global position sequence, detecting a trip termination event for the trip, stopping, in response to detecting the trip termination event for the trip, the tracking of global positions of the mobile device by deactivating the geolocation sensor of the mobile device, and calculating a length of the trip.

Other aspects of the invention will be apparent from the following description and the appended claims.

DETAILED DESCRIPTION

Figure 1:
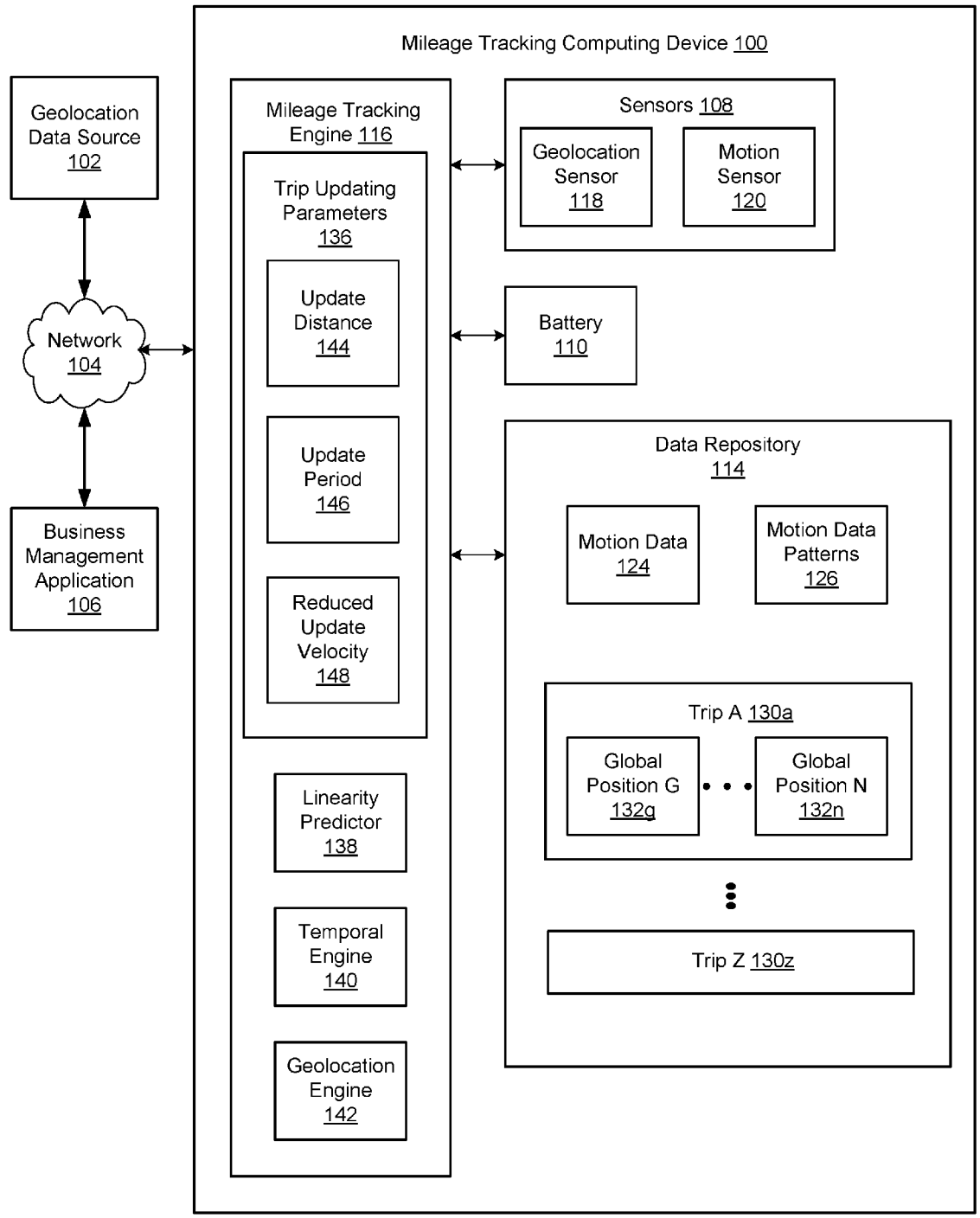
FIG. 1 shows a system in accordance with one or more embodiments disclosed herein.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a method, system, and non-transitory computer readable medium, for reducing battery consumption while automatically tracking mileage. As a result, the timeliness and accuracy of mileage reporting activities may be improved, without placing a heavy burden on the battery of a mobile device performing the method. Specifically, embodiments of the invention are directed to automatically tracking mileage while a user of the mobile device is driving (i.e., while a trip is in progress). The mileage tracking feature may be activated when a trip initiation event is detected, and may be deactivated when a trip termination event is detected (e.g., based on detecting that the user of the mobile device is no longer driving). In order to reduce the drain on a battery of the mobile device in between trips, activating the mileage tracking feature may activate a geolocation sensor of the mobile device, and deactivating the mileage tracking feature may deactivate the geolocation sensor. That is, the geolocation sensor may be activated and tracking positions of the mobile device only while a trip is in progress. In one or more embodiments, when the mileage tracking feature is deactivated, a geofence may be placed around the mobile device, such that crossing a boundary of the geofence may activate the mileage tracking feature, indicating that substantial movement has taken place (e.g., provided that the mobile device exceeds a minimum level of velocity, indicating that the user is driving).

Each trip may include a global position sequence of the mobile device. There is an inherent tradeoff between the number of global positions used to represent a trip and the accuracy of that representation. The number of global positions used to represent a trip may be reduced by exploiting the linearity of successive global positions of the trip. Each successive global position in the global position sequence may be obtained from a geolocation source when a trip updating event is detected. Detecting a trip updating event may be based on trip updating parameters including an update distance, an update period and a reduced update velocity. For example, fewer global positions may be obtained when the velocity of the mobile device is high (i.e., exceeding the reduced update velocity), such that a trip updating event may be detected based on comparing elapsed time to the update period, rather than on comparing distance traveled to the update distance. That is, when the mobile device is traveling at a high velocity, by the time the update period has elapsed, the mobile device may have moved well beyond the update distance. Reducing the number of global positions used to describe a trip may further reduce the drain on the battery of the mobile device (e.g., by reducing how often a geolocation sensor of the mobile device is activated).

Trip updating parameters may be adjusted based on a linearity prediction for the current trip, based on comparing a portion of the global position sequence of the current trip with a similar, and substantially linear portion of a global position sequence of a previous trip. The linearity prediction represents an opportunity to further reduce the drain on the battery of the mobile device by reducing the number of global positions obtained for the current trip when a portion of the current trip is predicted to be substantially linear. For example, fewer trip updating events may be detected by increasing the update distance and/or increasing the update period, so that fewer global positions are obtained for the current trip.

FIG. 1 shows a system in accordance with one or more embodiments of the invention. As shown in FIG. 1, the system includes a mileage tracking computing device (100), a geolocation data source (102), a network (104), and a business management application (BMA) (106). Each of these components is described below.

In one or more embodiments, the mileage tracking computing device (100), geolocation data source (102), and BMA (106) may be connected via the network (104). The mileage tracking computing device (100) may be the computing system (500) described with respect to FIG. 5A and the accompanying description below, or may be the client device (526) described with respect to FIG. 5B. The network (104) may be the network (520) described with respect to FIG. 5B.

The geolocation data source (102) may be one or more GPS satellites, a location data provider providing data over a computer network (104), a cellular tower, and/or any other geolocation data source capable of providing information related to the location of the mileage tracking computing device (100). In one or more embodiments of the invention, the BMA (106) may be an accounting application, a tax preparation application, a payroll application, a personnel application, any personal financial management application, any combination thereof, or any other application for managing an aspect of a business.

In one or more embodiments, the mileage tracking computing device (100) may include sensors (108). The sensors (108) may include a geolocation sensor (118), a motion sensor (120), and various other sensors. The geolocation sensor (118) may be any combination of software, firmware, and/or hardware that executes on the mileage tracking computing device (100) to track the global position of the mileage tracking computing device (100). The geolocation sensor (118) may be resident on the mileage tracking computing device (100), or be accessed via a wireless connection with another source of geolocation information, for example, a mobile access point. In one or more embodiments, the geolocation sensor (118) includes functionality to return geolocation (e.g., global positioning system (GPS)) coordinates detailing the global position of the mileage tracking computing device (100).

In one or more embodiments, the geolocation sensor (118) includes functionality to form a geofence around a location of the mileage tracking computing device (100). A geofence may define a virtual perimeter where a notification may be sent (e.g., by an operating system of the mileage tracking computing device (100)) when the mileage tracking computing device (100) crosses the virtual perimeter. In one or more embodiments, the geolocation sensor (118) may utilize a combination of technologies, including cellular data, wifi data, GPS data, etc. Implementing a geofence generally requires less power consumption, and therefore less battery output than obtaining GPS coordinates (i.e., exercising a GPS chipset generally requires high power output).

The motion sensor (120) (e.g., an accelerometer) may be any combination of software, firmware, and/or hardware that executes on the mileage tracking computing device (100) to provide motion data pertaining to the mileage tracking computing device (100).

Continuing with FIG. 1A, in one or more embodiments, the mileage tracking computing device (100) includes a battery (110), a data repository (114), and a mileage tracking engine (116). A battery (110) may be an electrochemical cell, or enclosed and protected material, that may be charged electrically to provide a static potential for power or released electrical charge when needed. In one or more embodiments, the data repository (114) is any type of storage unit and/or device (e.g., a file system, database, collection of tables, or any other storage mechanism) for storing data. Further, the data repository (114) may include multiple different storage units and/or devices. The multiple different storage units and/or devices may or may not be of the same type or located at the same physical site.

In one or more embodiments, the data repository (114) includes functionality to store motion data (124), motion patterns (126), and trips (130a-130z). In one or more embodiments, motion data (124) may be represented in terms of one or more motion attributes, including the velocity, acceleration, torque and/or orientation of the mileage tracking computing device (100). In one or more embodiments, the motion attributes may be represented using values for the x, y and z coordinate axes of the mileage tracking computing device (100). A motion pattern (126) may be based on motion data (124) obtained from the motion sensor (120). For example, the motion pattern (126) may suggest that a user is engaged with various physical activities (e.g., driving, walking, running, jogging, etc.).

In one or more embodiments, each trip (130a-130z) includes a sequence of global positions (132g-132n). The first global position (132g-132n) in the global position sequence is called the origin, and the last global position (132g-132n) in the global position sequence is called the destination. Each global position (132g-132n) may be, for example, defined in global positioning system (GPS) coordinates. In one or more embodiments, the origin of the trip (130a-130z) may be obtained when a trip initiation event is detected, and subsequent global positions (132g-132n) in the trip (130a-130z) may be obtained when a trip updating event is detected by the mileage tracking engine (116).

In one or more embodiments of the invention, the mileage tracking engine (116) includes trip updating parameters (136), a linearity predictor (138), a temporal engine (140), and a geolocation engine (142). In one or more embodiments, the trip updating parameters (136) include an update distance (144), an update period (146), and a reduced update velocity (148). The values of the trip updating parameters (136) may be predefined. In one or more embodiments, the mileage tracking engine (116) may include functionality to adjust the values of one or more trip updating parameters (136) (e.g., based on a prediction of the linearity predictor (138)).

In one or more embodiments of the invention, the mileage tracking engine (116) includes functionality to detect that a trip initiation event has occurred and therefore a trip (130a-130z) has begun. In one or more embodiments, detecting a trip initiation event may be based on receiving an alert that a geofence boundary has been crossed by the mileage tracking computing device (100). Alternatively, detecting a trip initiation event may be based on detecting (e.g., using an API of the mileage tracking computing device (100)) that the velocity of the mileage tracking computing device (100) exceeds a predefined minimum driving velocity. In one or more embodiments, the mileage tracking engine (116) may detect a trip initiation event by analyzing motion data (124) obtained from the motion sensor (120) relative to a motion pattern (126) (e.g., a motion pattern (126) that is correlated with a user of the mileage tracking computing device (100) driving a vehicle). In one or more embodiments, detecting a trip initiation event may be based on detecting a signal (e.g., a Bluetooth signal) from a vehicle used by a user of the mileage tracking computing device (100).

In one or more embodiments, the mileage tracking engine (116) includes functionality to detect a sequence of trip updating events, using one or more trip updating parameters (136). When a trip updating event is detected, the mileage tracking engine (116) may obtain an updated global position (132g-132n) of the mileage tracking computing device (100) to be added to the trip (130a-130z). For example, the mileage tracking engine (116) may obtain the global position (132g-132n) of the mileage tracking computing device (100) from the geolocation data source (102). In one or more embodiments, the mileage tracking engine (116) may request the global position (132g-132n) via an application programming interface (API), operating system or software application of the mileage tracking computing device (100).

In one or more embodiments, the trip updating event may be detected based on the update distance (144). For example, the mileage tracking engine (116) may request an alert from an operating system of the mileage tracking computing device (100) when the mileage tracking computing device (100) has moved a distance of at least the update distance (144), relative to a most recently obtained global position (132g-132n) of the mileage tracking computing device (100). For example, the mileage tracking engine (116) may register to be notified of location events from the operating system of the mileage tracking computing device (100). Alternatively, in one or more embodiments, the mileage tracking engine (116) may request that a geofence be setup by an operating system of the mileage tracking computing device (100), such that geofence boundary is at a distance from the current location of the mileage tracking computing device (100) equal to the update distance (144).

In one or more embodiments, detecting the trip updating event may be deferred until an amount of time has elapsed equal to or exceeding the update period (146), relative to a timestamp corresponding to the most recently obtained global position (132g-132n). In one or more embodiments, determining whether to defer detecting the trip updating event may be based on comparing the velocity of the mileage tracking computing device (100) to the reduced update velocity (148). In one or more embodiments, the mileage tracking engine (116) may obtain the velocity of the mileage tracking computing device (100) from the motion sensor (120).

Deferring the detection of one or more trip updating events may reduce the total number of trip updating events detected, and therefore may reduce the number updated global positions (132g-132n) obtained during the trip (130a-130z). For example, obtaining the global position (132g-132n) may be deferred (e.g., until the update period (146) has elapsed relative to a timestamp corresponding to the most recently obtained global position (132g-132n)) when the mileage tracking computing device (100) is moving at a high velocity that exceeds the reduced update velocity (148). That is, by the time the update period (146) has elapsed, the mileage tracking computing device (100) may have moved well beyond the update distance (144). Therefore, when the mileage tracking computing device (100) is moving at a high velocity, fewer global positions (132g-132n) may be required. For example, the high velocity may correlate with traveling on a straight road, requiring fewer global positions (132g-132n) to accurately synthesize a trip (130a-130z). That is, at high velocities, reaching the update period (146) may occur at a distance that is substantially beyond the update distance (144). Using the reduced update velocity (148) to reduce the number of requests for global positions (132g-132n) may result in fewer activations of the GPS chipset of the mileage tracking computing device (100), without any significant loss of route precision, thereby reducing the load on the battery (110) of the mileage tracking computing device (100).

In one or more embodiments of the invention, the mileage tracking engine (116) includes functionality to detect that a trip termination event has occurred and therefore a trip (130a-130z) has ended. In one or more embodiments, detecting a trip termination event may be based on detecting that an amount of time has elapsed equal to or exceeding a timeout period, relative to a timestamp corresponding to the most recently obtained global position (132g-132n) of the mileage tracking computing device (100).

In one or more embodiments of the invention, the mileage tracking engine (116) includes functionality to activate a geolocation sensor (118) of the mileage tracking computing device (100) in response to the detection of a trip initiation event. In one or more embodiments of the invention, the mileage tracking engine (116) includes functionality to deactivate the geolocation sensor (118) of the mileage tracking computing device (100) in response to the detection of a trip termination event.

In one or more embodiments of the invention, the mileage tracking engine (116) includes a linearity predictor (138). In one or more embodiments of the invention, the linearity predictor (138) is any hardware (e.g., circuitry), software, firmware, and/or any combination thereof. In one or more embodiments, the linearity predictor (138) may adjust one or more trip updating parameters (136) based on a linearity prediction. The linearity prediction may be an estimate of how linear the trip (130a-130z) will be going forward from the most recently obtained sequence of global positions (132g-132n). That is, the linearity prediction may estimate how accurately a straight line will connect the most recently obtained sequence of global positions (132g-132n) of the trip (130a-130z) to the next global position (132g-132n) obtained for the trip (130a-130z). The linearity prediction may be re-evaluated after each new global position (132g-132n) is obtained.

The linearity prediction may be based on factors that may be weighted in order to adjust the aggressiveness with which trip updating events are detected. In one or more embodiments, the linearity prediction may be based on comparing a sub-sequence of the global positions (132g-132n) of the current trip (130a-130z) (e.g., including the most recently obtained global positions (132g-132n) of the current trip (130a-130z)) with a similar, and sub-sequence of global positions (132g-132n) of a previous trip (130a-130z). In one or more embodiments, the sequence of vectors connecting the sub-sequence of global positions (132g-132n) of the previous trip (130a-130z) is substantially linear (i.e., approximates a straight line).

In one or more embodiments, the amount by which the trip updating parameters (136) are adjusted may be linearly or nonlinearly proportional to the linearity prediction. As an example, if the linearity prediction predicts that the succession of vectors between successive global positions (132g-132n) in the current trip (130a-130z) will be within 1 degree of a straight line (i.e., where a straight line is 180 degrees), then the update distance (144) and/or update period (146) may be increased by a factor of 50 percent. Similarly, if the linearity prediction predicts that the succession of vectors between successive global positions (132g-132n) in the current trip (130a-130z) will be between 1 degree and 2 degrees of a straight line, then the update distance (144) and/or update period (146) may be increased by a factor of 40 percent, etc. And if the linearity prediction predicts that the succession of vectors between successive global positions (132g-132n) in the current trip (130a-130z) will be within more than 5 degrees of a straight line, then no adjustments to the trip updating parameters (136) may be made.

In one or more embodiments, the similarity between the respective sub-sequences of global positions (132g-132n) of the current and previous trips (130a-130z) may be based on the similarity (e.g., within a tolerance margin) between the slopes of the vectors formed by successive global positions (132g-132n) in the sub-sequences of the global positions (132g-132n) of the respective trips (130a-130z). In one or more embodiments, the similarity between the respective sub-sequences of global positions (132g-132n) of the current and previous trips (130a-130z) may be based on identifying a global position (132g-132n) in the current trip (130a-130z) that is substantially coincident (e.g., having geolocation coordinates that are substantially the same, within a tolerance margin to account for measurement deviations when obtaining global positions) with a global position (132g-132n) in the previous trip (130a-130z).

The linearity prediction may be further based on a predicted destination global position (132g-132n) of the current trip (130a-130z). The predicted destination global position (132g-132n) may be a destination global position (132g-132n) of a previous trip (130a-130z), within a tolerance factor. For example, the predicted destination global position (132g-132n) may be a recurring global position (132g-132n) (e.g., at certain times of the day and/or days of the week). In addition, a predicted destination global position (132g-132n) of a trip (130a-130z) may be based on information obtained from a BMA (106) associated with the user of the mileage tracking computing device (100). For example, the predicted destination global position (132g-132n) may be based on a location of an appointment in on an online calendar of the user. Furthermore, the predicted destination global position (132g-132n) may be based on a contact (e.g., a business or personal contact) included in the BMA (106), where the BMA (106) may include contact information, including a physical address, for each contact. In one or more embodiments, the BMA (106) contact information may include a global position (132g-132n) corresponding to the physical address of the contact. For example, the global position (132g-132n) may be obtained from a geocoding service that converts a physical address to a set of geolocation coordinates.

In one or more embodiments, mileage tracking engine (116) may adjust one or more trip updating parameters (136) to reduce the number of requested global positions (132g-132n) in order to extend the life of the battery (110) when the battery level is low (e.g., when the mileage tracking computing device (100) may be close to losing power).

In one or more embodiments of the invention, the mileage tracking engine (116) includes a temporal engine (140). In one or more embodiments of the invention, the temporal engine (140) is any hardware (e.g., circuitry), software, firmware, and/or any combination thereof that includes functionality to obtain, process, and/or store temporal data.

In one or more embodiments of the invention, the temporal engine (140) includes functionality to obtain and/or generate temporal data. In one or more embodiments of the invention, temporal data refers to any data related to time or that may be used for determining a time. Such data may be stored in the data repository (114), and may include, but is not limited to, information such as temporal information included in and/or derived from geolocation data, information related to time received via a network, information related to time obtained locally from the device on which the temporal engine (140) executes, and/or any other source of temporal data. Temporal data may be stored in any unit of time (e.g., minutes, hours, days, etc.) and a given time value may be stored as one or more unit types. In one or more embodiments of the invention, though not shown in FIG. 1, the mileage tracking computing device (100) includes one or more clock devices for keeping time, and the temporal engine (140) may include functionality to obtain temporal data from the one or more clock devices.

In one or more embodiments of the invention, the geolocation engine (142) includes functionality to obtain geolocation data. In one or more embodiments of the invention, geolocation data refers to any data that may be used for determining a location/position. Geolocation data may include, but is not limited to, information such as coordinates obtained or calculated by the geolocation engine (142), distance information from landmarks (e.g., cellular towers), signal strength, and timestamp information.

The geolocation engine (142) may include functionality to determine position/location using the geolocation data received from the geolocation data source (102). Such a determination may include any amount of processing or calculation. For example, geolocation data may be obtained from three GPS satellites and include the location of the satellites and a timestamp. The geolocation engine (142) may then perform a trilateration calculation and/or perform other processing steps to determine a longitude and latitude corresponding to the position of the mileage tracking computing device (100). As another example, the geolocation data may additionally include data obtained over a wireless network and/or from one or more cellular towers, and such additional information may be used when determining position.

While FIG. 1 shows a configuration of components, other configurations may be used without departing from the scope of the invention. For example, various components may be combined to create a single component. As another example, the functionality performed by a single component may be performed by two or more components.

Figure 2:
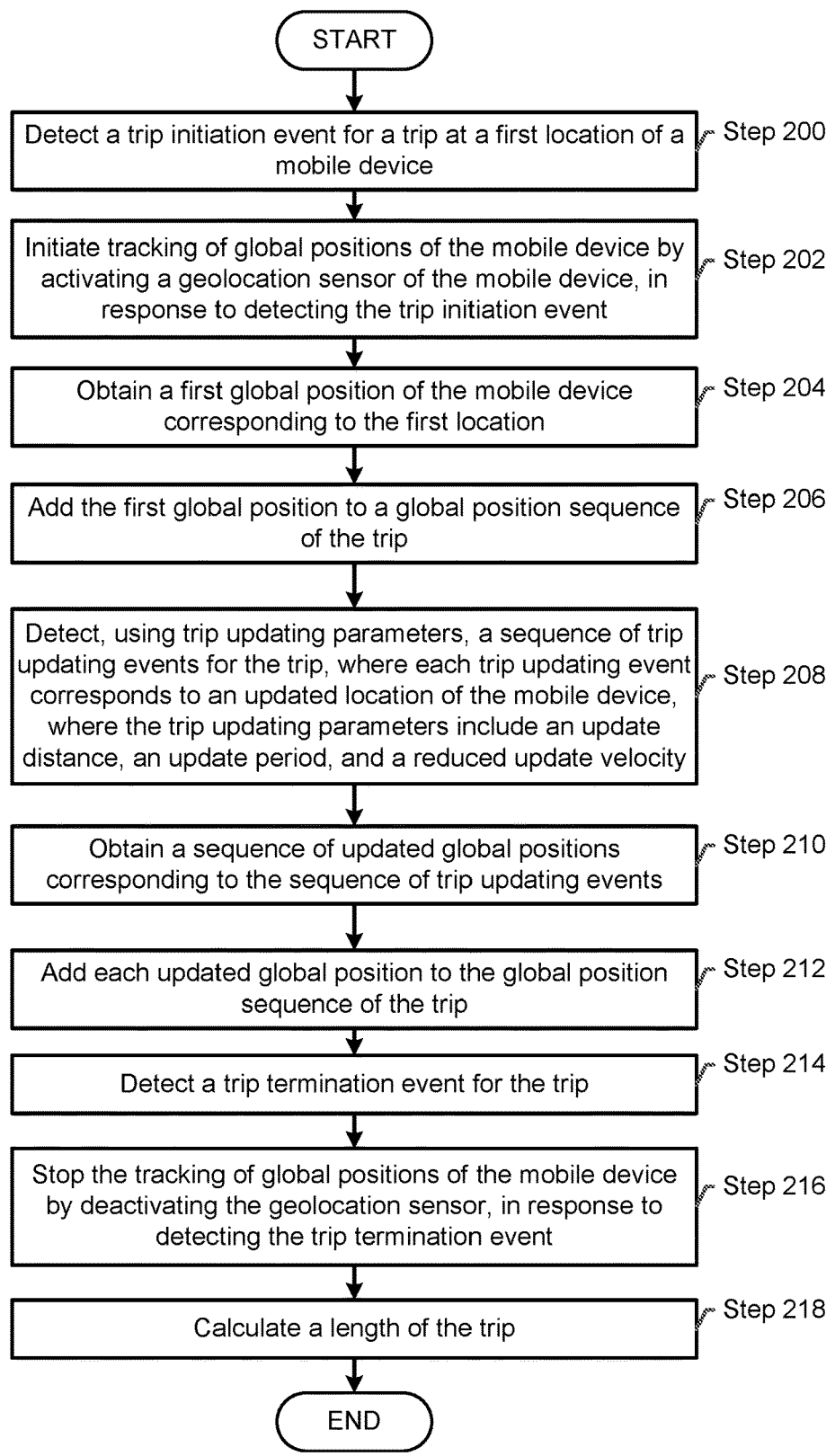
FIG. 2 and FIG. 3 show flowcharts in accordance with one or more embodiments disclosed herein.

FIG. 2 shows a flowchart in accordance with one or more embodiments of the invention. The flowchart depicts a process for automatically tracking mileage. One or more of the steps in FIG. 2 may be performed by the components of the mileage tracking computing device (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, in Step 200, a trip initiation event for a trip is detected at a first location of a mobile device (e.g., the mileage tracking computing device). In one or more embodiments, detecting the trip initiation event may be based on receiving an alert that a geofence boundary has been crossed by the mobile device. For example, in one or more embodiments, the geofence perimeter may be defined to indicate a boundary beyond which significant movement is deemed to have occurred (e.g., relative to a starting location of the mobile device), and therefore a new trip has been initiated. In one or more embodiments, the geofence may be defined using an API or operating system of the mobile device. Using a geofence to detect significant movement may conserve battery power, since implementing a geofence may not require an active geolocation (e.g., GPS) capability. That is, prior to executing Step 200, in one or more embodiments, a geolocation capability of the mobile device may be deactivated.

Alternatively, detecting a trip initiation event may be based on detecting that the velocity of the mobile device exceeds a predefined minimum driving velocity. In one or more embodiments, the velocity of the mobile device may be calculated based on coordinates (e.g., GPS coordinates) obtained from a geolocation sensor of the mobile device. Another alternative is detecting a trip initiation event based on identifying a motion pattern based on motion data obtained from a motion sensor of the mobile device. For example, a specific pattern of motion of the mobile device may correlate with a user of the mobile device driving a vehicle.

In Step 202, tracking of global positions of the mobile device is initiated by activating a geolocation sensor of the mobile device, in response to detecting the trip initiation event for the trip. In one or more embodiments, the global positions of the mobile device may be tracked using a geolocation (e.g., GPS) sensor of the mobile device in conjunction with a geolocation (e.g., GPS) data source. In one or more embodiments, the tracking of global positions of the mobile device may be tracked until a trip termination event is detected.

In Step 204, a first global position of the mobile device corresponding to the first location is obtained. The first global position may include a first timestamp. In one or more embodiments, the first global position may be any geolocation data obtained from a geolocation data source that may be used for determining a location/position. In one or more embodiments, the global position may be obtained via an API, operating system or software application of the mobile device.

In Step 206, the first global position is added to a global position sequence of the trip. The first global position may be referred to as the origin of the trip.

In Step 208, a sequence of trip updating events for the trip is detected using trip updating parameters. Each trip updating event may correspond to an updated location of the mobile device. In one or more embodiments, the trip updating parameters may include an update distance, an update period, and a reduced update velocity.

In one or more embodiments, the trip updating event may be detected when the mobile device has moved a distance of at least the update distance, relative to a most recently obtained global position of the mobile device (e.g., detected via a location event notification from an operating system of the mobile device). In one or more embodiments, the trip updating event may be detected when the mobile device crosses a geofence boundary whose distance from the most recently obtained global position is equal to the update distance.

In one or more embodiments, detecting the trip updating event may be deferred until an amount of time has elapsed equal to or exceeding the update period, relative to a timestamp corresponding to the most recently obtained global position. In one or more embodiments, determining whether to defer detecting the trip updating event may be based on comparing the velocity of the mobile device to the reduced update velocity. In one or more embodiments, the velocity of the mobile device may be obtained from the motion sensor.

In Step 210, a sequence of updated global positions corresponding to the sequence of trip updating events (from Step 208) is obtained. See earlier description of Step 204.

In Step 212, each updated global position in the sequence of updated global positions is added to the global position sequence of the trip. The global positions in the global position sequence may be ordered (i.e., sequenced) based on their corresponding timestamps. In one or more embodiments, an updated global position may not be added to the global position sequence of the trip if the updated global position is a repeated global position that is already present in the global position sequence of the trip. That is, in one or more embodiments, it may be assumed that a repeated global position is invalid, and indicates that a geolocation measurement error may have occurred. For example, a location may appear to "drift" when the location is near the boundary of different geolocation sensors (e.g., different cell towers), such that more than one global position may be obtained for the same location. If a global position sequence includes a repeated global position separated by an intervening global position, then the intervening global position may be due to drift, and all three global positions may correspond to the same location, and no actual movement has occurred. In one or more embodiments, one or more global positions may be removed from the global position sequence of the trip when a repeated global position is detected.

In Step 214, a trip termination event for the trip is detected. In one or more embodiments, detecting the trip termination event may be based on detecting that an amount of time has elapsed equal to or exceeding a timeout period, relative to a timestamp corresponding to the most recently obtained global position of the mobile device. In one or more embodiments, upon detecting the trip termination event, a geofence is generated around the most recently obtained global position of the mobile device (e.g., to trigger a subsequent trip initiation event, as described in Step 200 above).

In one or more embodiments, the most recently obtained global position of the mobile device is added to a global position sequence of a second trip. That is, upon detecting a trip termination event, the most recently obtained global position may function as both a destination (i.e., last global position) of the first trip and an origin (i.e., first global position) of the second trip. In one or more embodiments, the origin of the second trip may subsequently be removed if an origin offset distance from the origin of the second trip to the next global position following the origin of the second trip in the global position sequence of the second trip exceeds a predefined origin displacement limit That is, the destination of the first trip may not always coincide with the origin of the second trip if there is a discontinuity between the end of the first trip and the start of the second trip. For example, the user of the mobile device may have concluded the first trip at a transportation terminal (e.g., an airport), or may have even walked a great distance. Therefore, when initiation of the second trip may be subsequently triggered, and the next global position obtained, the user may have indeed traveled substantially, but without driving a vehicle.

In Step 216, the tracking of global positions of the mobile device is stopped, by deactivating the geolocation sensor of the mobile device, in response to detecting the trip termination event. That is, deactivating the geolocation sensor may reduce the drain on a battery of the mobile device when the user of the mobile device is no longer driving, during a time interval between the termination of one trip and the initiation of a subsequent trip.

In Step 218, a length of the trip is calculated. In one or more embodiments, calculating the length of the trip may include adding the distances between successive global positions in the global position sequence of the trip.

Those skilled in the art will understand that Step 202, Step 204, Step 206, Step 208, Step 210, Step 212, Step 214, Step 216, and Step 218 of FIG. 2 may be executed for each trip initiation event detected in Step 200.

Figure 3:
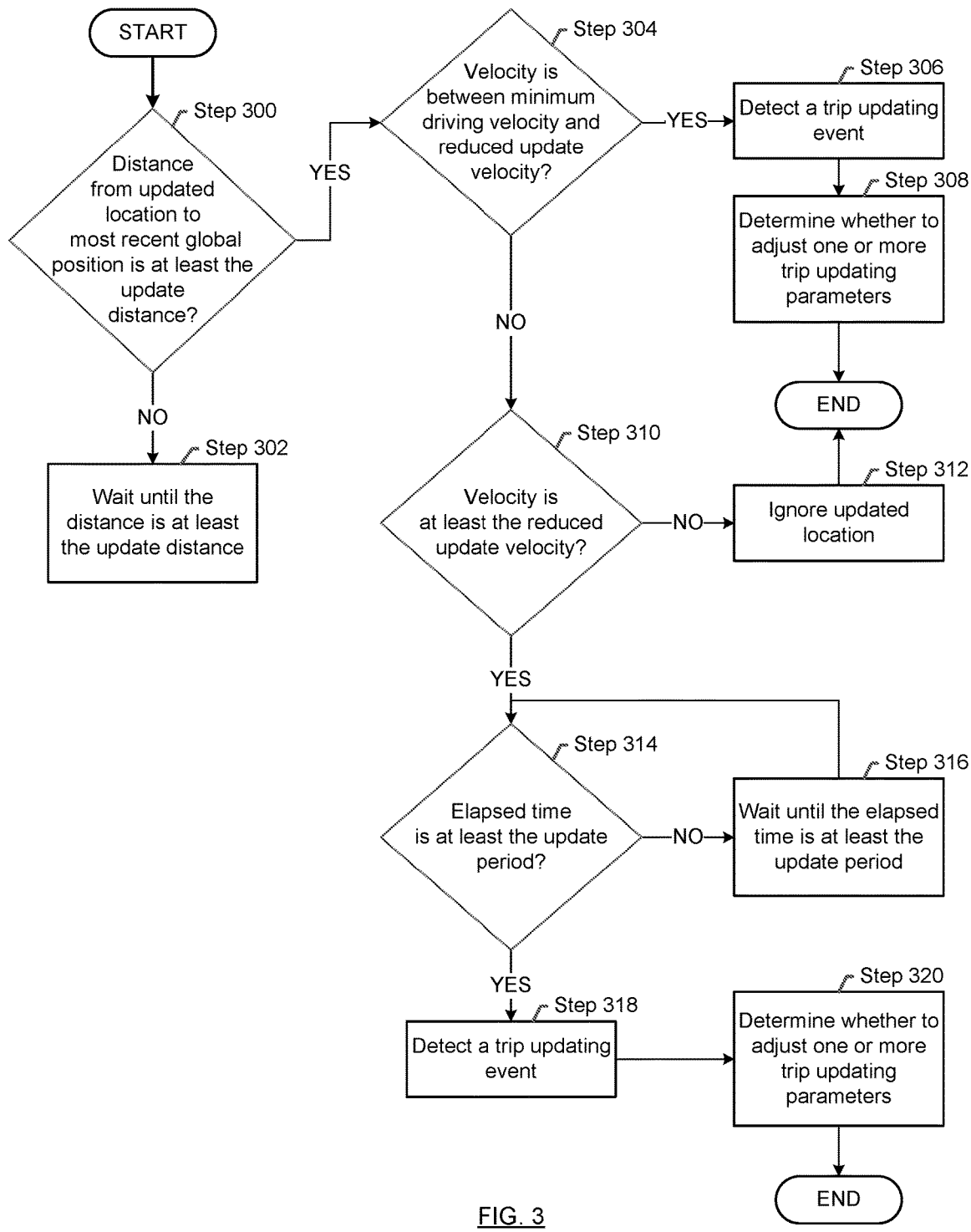

FIG. 3 shows a flowchart in accordance with one or more embodiments of the invention. The flowchart depicts a process for detecting a sequence of trip updating events. Moreover, the flowchart in FIG. 3 may correspond to Step 208 in FIG. 2. One or more of the steps in FIG. 3 may be performed by the components of the mileage tracking computing device (100), discussed above in reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, in Step 300, it is determined whether a distance from an updated location of the mobile device to a most recently obtained global position is at least the update distance. If the distance from the updated location to the most recently obtained global position is at least the update distance, then Step 304 below is performed. If the distance from the updated location to the most recently obtained global position is not at least the update distance, then in Step 302 a wait loop is entered until the distance from the updated location of the mobile device to the most recently obtained global position is at least the update distance. That is, in one or more embodiments, detecting a trip updating event may require that the mobile device travel a distance of at least the update distance.

In Step 304, it is determined whether a velocity of the mobile device is between a minimum driving velocity and the reduced update velocity. In one or more embodiments, the minimum driving velocity is a velocity below which it is determined that a user of the mobile device is not driving (e.g., the user is walking, standing still, etc.). If the velocity of the mobile device is not between the minimum driving velocity and the reduced update velocity, then Step 310 below is performed. If the velocity of the mobile device is between the minimum driving velocity and the reduced update velocity, then in Step 306, a trip updating event is detected. That is, Step 306 represents detecting a trip updating event based on the mobile device traveling a distance of at least the update distance.

In Step 308, a determination is made regarding whether to adjust one or more trip updating parameters. In one or more embodiments, the determination is made based a linearity prediction for the current trip that represents an opportunity to reduce the burden on the battery of the mobile device by reducing the number of global positions obtained for the current trip (e.g., by increasing the update distance and/or increasing the update period). That is, fewer global positions may be required to accurately model the current trip when a portion of the trip is substantially linear. In one or more embodiments, the linearity prediction may be based on comparing a sub-sequence of the global position sequence of the current trip (e.g., including the most recently obtained global positions of the trip) with a similar, and substantially linear sub-sequence of a global position sequence of a previous trip. In one or more embodiments, the sequence of vectors connecting the global positions in the global position sub-sequence of the previous trip approximates a straight line.

In one or more embodiments, the similarity between the respective global position sub-sequences of the current and previous trips may be based on the similarity between the slopes of the vectors formed by successive global positions in the global position sub-sequences of the respective trips. In one or more embodiments, the similarity between the respective global position sub-sequences of the current and previous trips may be based on identifying a global position in the current trip that is substantially coincident (e.g., having geolocation coordinates that are substantially the same within a tolerance margin) with a global position in the previous trip.

The linearity prediction may be further based on a predicted destination global position of the trip. The predicted destination global position may be a destination global position of one or more previous trips, within a tolerance factor to account for measurement deviations when obtaining global positions.

In Step 310, if the velocity of the mobile device is at least the reduced update velocity, then Step 314 below is performed. Otherwise, in Step 312, the updated location is ignored, and a trip updating event is not detected. That is, the location may be ignored because velocity of the mobile device is below the minimum driving velocity (i.e., the user of the mobile device is not driving).

If, in Step 314, it is determined that the elapsed time is at least the update period, then in Step 318 a trip updating event is detected. That is, Step 318 represents detecting a trip updating event based on the elapsed time being at least the update period, in contrast to Step 306 where the trip updating event is detected based on the mobile device traveling a distance of at least the update distance.

If the elapsed time is not at least the update period, then, in Step 316 a wait loop is entered until the elapsed time is at least the update period.

In one or more embodiments, the elapsed time may be at least the update period because the mobile device has recovered from a hardware or software failure, and thus had been unable to detect trip updating events or obtain global positions for the duration of the failure. Upon recovery from the failure, the mobile device may detect a trip updating event due to the distance from the updated location of the mobile device to a most recently obtained global position being at least the update distance, in which case one or more trip updating events and corresponding global positions may have been lost, resulting in loss of precision in the global position sequence of the trip. That is, a straight line interpolation may be used in lieu of the lost global positions corresponding to the lost trip updating events.

In one or more embodiments, the reduced update velocity may be used to reduce the number of trip updating events detected, by deferring the detection of trip updating events, thereby reducing the number of updated global positions obtained during the trip. Detecting a trip updating event may be deferred until the update period has elapsed when the mobile device is moving at a high velocity that is at least the reduced update velocity. In one or more embodiments, by the time the update period has elapsed, since the mobile device is traveling at a high velocity, the mobile device may have moved substantially beyond the update distance. Traveling at a high velocity may correlate with traveling on a straight road, which requires fewer global positions to synthesize an accurate global position sequence (i.e., route) of a trip. Using the reduced update velocity to reduce the number of requests for global positions may result in fewer activations of the GPS chipset of the mobile device, thereby reducing the load on the battery of the mobile device.

In Step 320, a determination is made regarding whether to adjust one or more trip updating parameters. See earlier description of Step 308 above.

Figure 4:
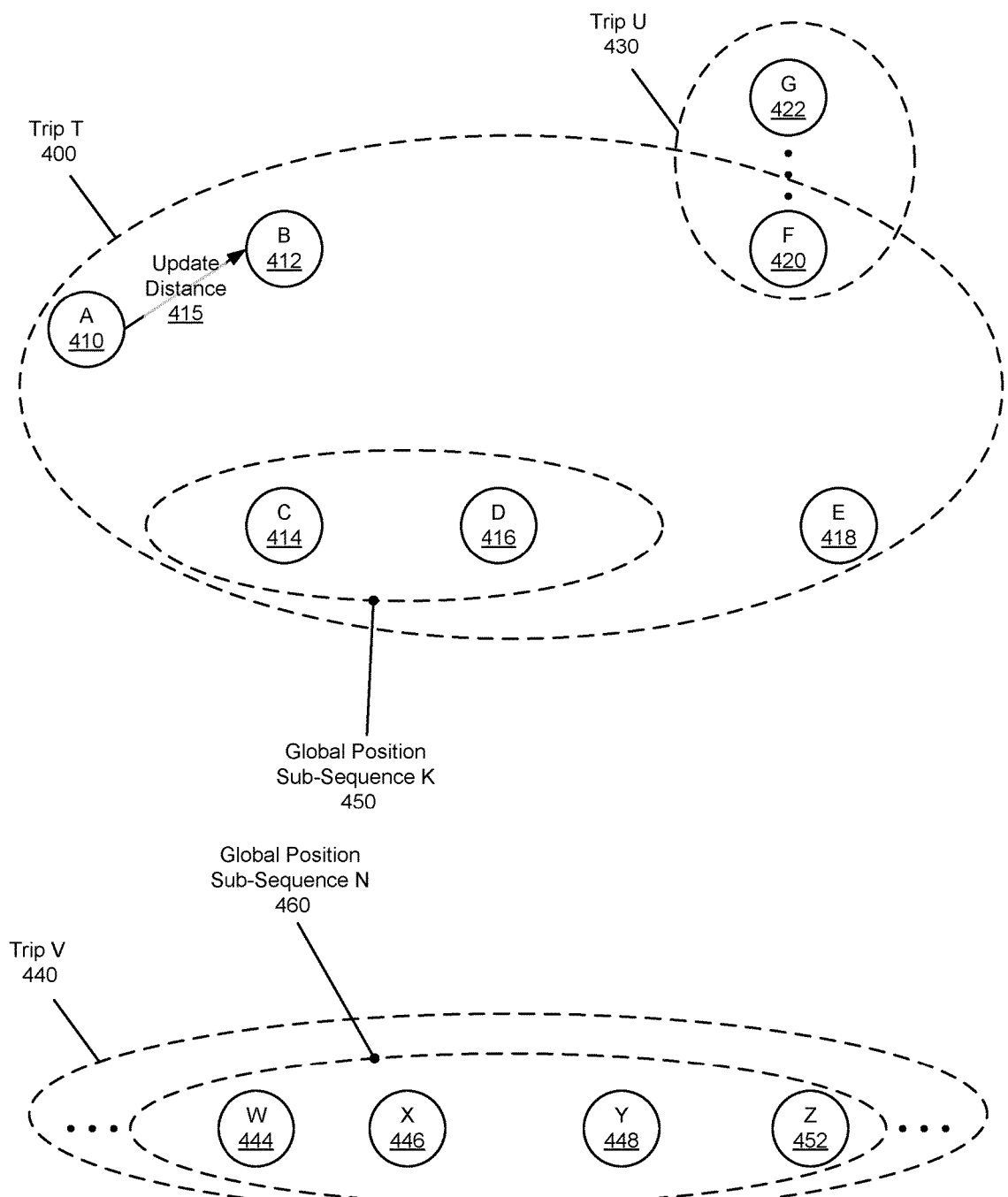
FIG. 4 shows an example in accordance with one or more embodiments disclosed herein.

The following example is for explanatory purposes only and not intended to limit the scope of the invention. FIG. 4 shows an implementation example in accordance with one or more embodiments of the invention. FIG. 4 shows a current trip T (400) tracked by a mileage tracking engine running on a mobile device for a user needing to track mileage (e.g., for an expense report or self-employment tax reporting). Trip T (400) includes a global position sequence that includes global position A (410), global position B (412), global position C (414), global position D (416), global position E (418), and global position F (420).

A trip initiation event for trip T (400) is detected when the mileage tracking engine is alerted that significant movement has occurred (e.g., when a geofence boundary is crossed by the mobile device, or when motion data obtained from a motion sensor of the mobile device indicates that a minimum driving velocity, for example, 10 miles per hour, had been reached). The detection of the trip initiation event initiates the tracking of global positions of the mobile device, by activating a geolocation sensor of the mobile device. A first global position A (410) (i.e., the origin of trip T (400)) is then obtained from a geolocation data source and is added to trip T (400).

Subsequent global positions (412, 414, 416, 418, 420) are added when trip updating events are detected, relative to trip updating parameters. The trip updating parameters include an update distance (415) of 0.25 miles, an update period of 30 seconds, and a reduced update velocity of 50 miles per hour. A second global position B (412) is obtained and added to trip T (400) when the mobile device moves a distance equal to the update distance (415) from global position A (410), as shown in FIG. 4. The trip updating event is detected once the update distance (415) is reached because the velocity of the mileage tracking computing device is 25 miles per hour at the time the update distance (415) is reached, which is below the reduced update velocity of 50 miles per hour.

A third global position C (414) is obtained and added to trip T (400) when an amount of time has elapsed equal to the update period of 30 seconds, due to the high velocity of the mobile device. For example, the trip updating event is not detected immediately upon reaching the update distance of 0.25 miles because the velocity of the mobile device is 60 miles per hour at the time the update distance is reached (e.g., after 15 seconds), which exceeds the reduced update velocity of 50 miles per hour. Therefore, detecting the trip updating event is deferred until the update period has elapsed, relative to the timestamp of the most recently obtained global position, in this case global position B (412). Therefore, the distance traveled between global position B (412) and global position C (414) exceeds the update distance of 0.25 miles. Assuming that the average velocity of the mobile device is 60 miles per hour between global position B (412) and global position C (414), then the distance traveled between global position B (412) and global position C (414) is 0.5 miles. In contrast, the distance traveled between global position A (410) and global position B (412) is only 0.25 miles (i.e., the update distance).

In a similar fashion, global position D (416), global position E (418), and global position F (420) are added to trip T (400) when subsequent trip updating events are detected, based on the trip updating parameters. For example, global position D (416) is added when the update distance of 0.25 miles is reached, since the mobile device is moving below the reduced update velocity (and above the minimum driving velocity) between global position C (414) and global position D (416). In contrast, global position E (418) is added when the update period has elapsed, since the mobile device is moving above the reduced update velocity between global position D (416) and global position E (418), and therefore the distance between global position D (416) and global position E (418) exceeds the update distance of 0.25 miles.

After adding each new global position to trip T (400) in response to detecting a trip updating event, the mileage tracking engine looks for opportunities to reduce the drain on the battery of the mobile device by reducing the number of global positions obtained to model trip T (400). The mileage tracking engine reduces the number of global positions obtained based on predicting substantial linearity for a portion of trip T (400) as global positions are obtained. That is, fewer global positions will be required to accurately model a portion of trip T (400) that substantially approximates a straight line.

After adding global position D (416) to trip T (400), the mileage tracking engine identifies a substantially linear global position sub-sequence N (460) in a previous trip V (440) that is similar to the most recently obtained global position sub-sequence K (450) of trip T (400). The similarity between global position sub-sequence K (450) and global position sub-sequence N (460) is based on several factors. First, there are global positions in each sub-sequence that are substantially coincident, within a tolerance margin. For example, global position D (416) of trip T (400) has geolocation coordinates that are substantially the same as the geolocation coordinates of global position X (446) of trip V (440). Second, the slopes of the vectors connecting the global positions in each sub-sequence are similar, within a tolerance margin. For example, the slope of the vector connecting global position C (414) and global position D (416) in trip T (400) is substantially the same as the slopes of the sequence of vectors connecting global position W (444), global position X (446), global position Y (448), and global position Z (452) of trip V (440). Third, the sequence of vectors connecting the global positions in the global position sub-sequence N (460) is substantially linear, within a tolerance margin. That is, combining the vectors connecting the global positions in the global position sub-sequence N (460) nearly results in a straight line. Fourth, a predicted destination global position of trip T (400) (e.g., global position F (420)) may also be the same destination global position of trip V (440), thereby increasing the likelihood that the remainder of trip T (400) will be similar to trip V (440).

Based on the above factors, it is possible to predict substantial linearity as further global positions are obtained for the current trip T (400), relative to the global position sub-sequence (450) that includes global position C (414) and global position D (416). The mileage tracking engine then reduces the number of global positions obtained for trip T (400) by adjusting one or more trip updating parameters, such as increasing the update distance to 0.5 miles and/or increasing the update period to 60 seconds. The mileage tracking engine later reverts the trip updating parameters back to their original values once the most recent global position sub-sequence of trip T (400) is no longer similar to a substantially linear global position sub-sequence of a previous trip.

Subsequent to adding global position F (420) to trip T (400), a timeout occurs based on a predefined timeout period (e.g., without the mobile device moving at least the update distance from global position F (420)), triggering the detection of a trip termination event. The detection of the trip termination event stops the tracking of global positions of the mobile device, and deactivates the geolocation sensor of the mobile device, in order to reduce the drain on the battery of the mobile device (e.g., until the detection of a subsequent trip initiation event again initiates the tracking of global positions). Global position F (420) is the last global position in trip T (400), and therefore global position F (420) is the destination of trip T (400). The length of trip T (400) is then calculated by adding the distances between each pair of succession global positions (410, 412, 414, 416, 418, 420) in trip T (400).

A new trip U (430) is then created, whose origin is global position F (420), which is also the destination of the now completed trip T (400). That is, it may be assumed that successive trips are continuous, such that the destination of a completed trip is also the origin of the next trip. Subsequently, a trip initiation event is detected for trip U (430), which again initiates tracking of global positions of the mobile device and activates the geolocation sensor of the mobile device. However, it turns out that in this case this trip continuity assumption is false, and in fact, trip U (430) is discontinuous relative to trip T (400). That is, subsequent to the conclusion of trip T (400), the user of the mobile device traveled without driving (e.g., the user walked, or traveled by plane, train, etc.). The discontinuity is detected by checking whether a large distance (e.g., exceeding a predefined origin displacement limit) separates global position F (420) (the origin of trip U (430)) from global position G (422), the global position immediately following the origin of trip U (430). Therefore, since it is detected that trip U (430) is discontinuous from trip T (400), global position F (420) is removed from trip U (430).

Figure 5A:
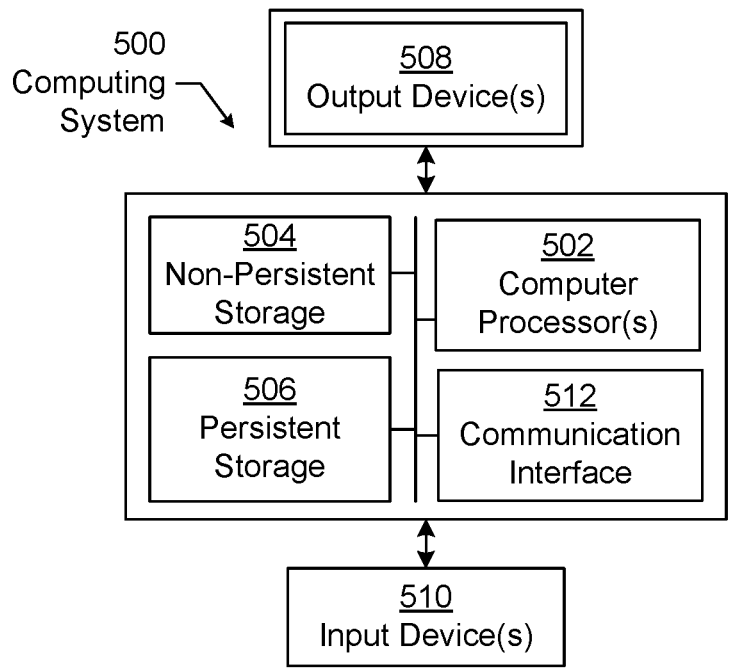
FIG. 5A and FIG. 5B show computing systems in accordance with one or more embodiments disclosed herein.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
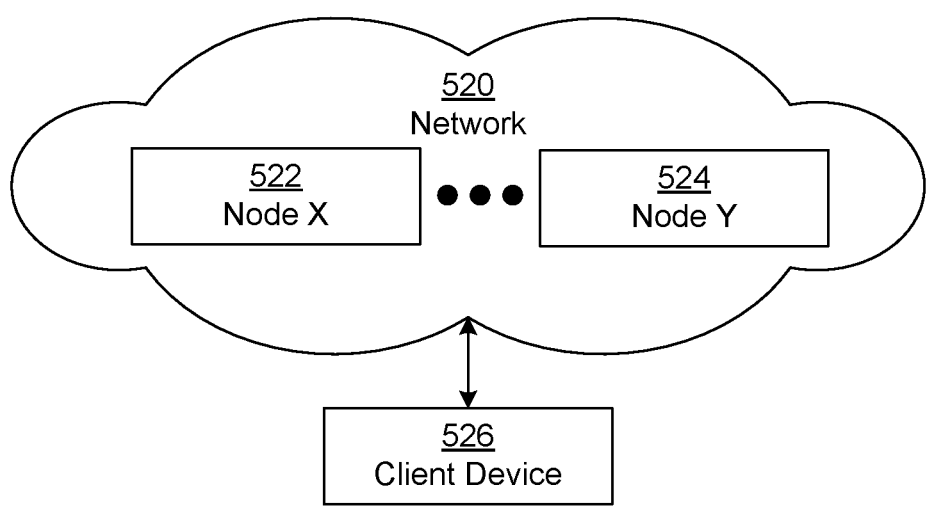

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for reducing battery consumption while automatically tracking mileage, comprising:
  initiating, by activating a geolocation sensor of a mobile device, tracking of global positions of the mobile device;
  obtaining a first global position of the mobile device corresponding to the first location, wherein the first global position comprises a first timestamp;
  adding the first global position to a first global position sequence of the first trip;
  detecting, using a plurality of trip updating parameters, a sequence of trip updating events for the first trip,
    wherein one or more trip updating events of the sequence of trip updating events correspond to an updated location of the mobile device,
    wherein the plurality of trip updating parameters comprises an update distance, an update period, and a threshold velocity, and
    wherein detecting the one or more trip updating events comprises:
      when a velocity of the mobile device is below the threshold velocity, determining that a distance from the updated location to a most recently obtained global position of the first global position sequence is at least the update distance, and
      when the velocity of the mobile device is at least the threshold velocity, determining that an elapsed time from a timestamp of the most recently obtained global position of the first global position sequence is at least the update period;

obtaining a sequence of updated global positions corresponding to the sequence of trip updating events, wherein each updated global position of the sequence of updated global positions comprises an updated timestamp;

adding each updated global position of the sequence of updated global positions to the first global position sequence; and calculating a length of the first trip.

2. The method of claim 1, further comprising:

detecting a trip termination event for the first trip, wherein detecting the trip termination event for the first trip comprises setting a geofence around a destination of the first trip, wherein the destination of the first trip is a last global position of the first global position sequence, and wherein the method further comprises detecting a trip initiation event for a second trip of the mobile device, wherein detecting the trip initiation event for the second trip comprises detecting a crossing of a boundary of the geofence.

3. The method of claim 2, further comprising:

adding the destination of the first trip to a second global position sequence of the second trip;

calculating an origin offset distance between the destination of the first trip and a next global position of the second global position sequence, wherein the next global position immediately follows the destination of the first trip in the second global position sequence;

determining that the origin offset distance exceeds an origin displacement limit; and removing the destination of the first trip from the second global position sequence.

4. The method of claim 2, further comprising detecting a trip initiation event for the first trip, wherein:

detecting the trip initiation event for the first trip comprises analyzing motion data obtained from a motion sensor of the mobile device, wherein the tracking is initiated in response to detecting the trip initiation event for the first trip, and detecting the trip termination event for the first trip further comprises analyzing motion data obtained from the motion sensor of the mobile device.

5. The method of claim 1, wherein detecting the one or more trip updating events further comprises, when the velocity of the mobile device is below the threshold velocity:

determining that the velocity of the mobile device is at least a minimum driving velocity.

6. The method of claim 1, further comprising:

adjusting one or more trip updating parameters of the plurality of trip updating parameters based on a linearity prediction for the first trip, wherein the linearity prediction is based on comparing a portion of the first global position sequence with a portion of a previous global position sequence of a previous trip.

7. A system for reducing battery consumption while automatically tracking mileage, comprising:

a mobile device comprising a geolocation sensor, a computer processor, and a memory comprising instructions that, when executed by the computer processor, cause the computer processor to:

initiate, by activating the geolocation sensor, tracking of global positions of the mobile device;

obtain a first global position of the mobile device corresponding to the first location, wherein the first global position comprises a first timestamp;

add the first global position to a first global position sequence of the first trip;

detect, using a plurality of trip updating parameters, a sequence of trip updating events for the first trip, wherein one or more trip updating events of the sequence of trip updating events corresponds to an updated location of the mobile device, wherein the plurality of trip updating parameters comprises an update distance, an update period, and a threshold velocity, and wherein detecting the one or more trip updating events comprises:

when a velocity of the mobile device is below the threshold velocity, determining that a distance from the updated location to a most recently obtained global position of the first global position sequence is at least the update distance, and when the velocity of the mobile device is at least the threshold velocity, determining that an elapsed time from a timestamp of the most recently obtained global position of the first global position sequence is at least the update period;

obtain a sequence of updated global positions corresponding to the sequence of trip updating events, wherein each updated global position of the sequence of updated global positions comprises an updated timestamp;

add each updated global position of the sequence of updated global positions to the first global position sequence; and a data repository storing at least the first trip.

8. The system of claim 7, wherein the memory further comprises instructions that, when executed by the processor, cause the processor to:

detect a trip termination event for the first trip, wherein detecting the trip termination event for the first trip comprises setting a geofence around a destination of the first trip, wherein the destination of the first trip is a last global position of the first global position sequence, and wherein the memory further comprises instructions that, when executed by the processor, cause the processor to:

detect a trip initiation event for a second trip of the mobile device, wherein detecting the trip initiation event for the second trip comprises detecting a crossing of a boundary of the geofence.

9. The system of claim 8, wherein the memory further comprises instructions that, when executed by the processor, cause the processor to:

add the destination of the first trip to a second global position sequence of the second trip;

calculate an origin offset distance between the destination of the first trip and a next global position of the second global position sequence, wherein the next global position immediately follows the destination of the first trip in the second global position sequence;

determine that the origin offset distance exceeds an origin displacement limit; and remove the destination of the first trip from the second global position sequence.

10. The system of claim 8, wherein:

the mobile device further comprises a motion sensor, and the memory further comprises instructions that, when executed by the processor, cause the processor to:
detect a trip initiation event for the first trip,
detect the trip initiation event for the first trip by analyzing motion data obtained from the motion sensor, and
detect the trip termination event for the first trip further by analyzing motion data obtained from the motion sensor.

11. The system of claim 7, wherein detecting the one or more trip updating events further comprises, when the velocity of the mobile device is below the threshold velocity:
determining that the velocity of the mobile device is at least a minimum driving velocity.

12. The system of claim 7, wherein the memory further comprises instructions that, when executed by the processor, cause the processor to:
adjust one or more trip updating parameters of the plurality of trip updating parameters based on a linearity prediction for the first trip, wherein the linearity prediction is based on comparing a portion of the first global position sequence with a portion of a previous global position sequence of a previous trip.

13. A non-transitory computer readable medium comprising instructions that, when executed by a processor, perform a method for reducing battery consumption while automatically tracking mileage, comprising:
initiating, by activating a geolocation sensor of a mobile device, tracking of global positions of the mobile device;
obtaining a first global position of the mobile device corresponding to the first location, wherein the first global position comprises a first timestamp;
adding the first global position to a first global position sequence of the first trip;
detecting, using a plurality of trip updating parameters, a sequence of trip updating events for the first trip,
wherein one or more trip updating events of the sequence of trip updating events corresponds to an updated location of the mobile device,
wherein the plurality of trip updating parameters comprises an update distance, an update period, and a threshold velocity, and
wherein detecting the one or more trip updating events comprises:
when a velocity of the mobile device is below the threshold velocity, determining that a distance from the updated location to a most recently obtained global position of the first global position sequence is at least the update distance, and
when the velocity of the mobile device is at least the threshold velocity, determining that an elapsed time from a timestamp of the most recently obtained global position of the first global position sequence is at least the update period;
obtaining a sequence of updated global positions corresponding to the sequence of trip updating events, wherein each updated global position of the sequence of updated global positions comprises an updated timestamp;
adding each updated global position of the sequence of updated global positions to the first global position sequence; and
calculating a length of the first trip.

14. The non-transitory computer readable medium of claim 13, wherein the method further comprises:
detecting a trip termination event for the first trip,
wherein detecting the trip termination event for the first trip comprises setting a geofence around a destination of the first trip, wherein the destination of the first trip is a last global position of the first global position sequence, and
wherein the method further comprises detecting a trip initiation event for a second trip of the mobile device, wherein detecting the trip initiation event for the second trip comprises detecting a crossing of a boundary of the geofence.

15. The non-transitory computer readable medium of claim 14, wherein the method further comprises:
adding the destination of the first trip to a second global position sequence of the second trip;
calculating an origin offset distance between the destination of the first trip and a next global position of the second global position sequence, wherein the next global position immediately follows the destination of the first trip in the second global position sequence;
determining that the origin offset distance exceeds an origin displacement limit; and
removing the destination of the first trip from the second global position sequence.

16. The non-transitory computer readable medium of claim 13, wherein detecting the one or more trip updating events further comprises, when the velocity of the mobile device is below the threshold velocity:
determining that a velocity of the mobile device is at least a minimum driving velocity.

17. The non-transitory computer readable medium of claim 13, further comprising:
adjusting one or more trip updating parameters of the plurality of trip updating parameters based on a linearity prediction for the first trip, wherein the linearity prediction is based on comparing a portion of the first global position sequence with a portion of a previous global position sequence of a previous trip.

* * * * *